US009468044B2

(12) United States Patent
Feng et al.

(10) Patent No.: US 9,468,044 B2
(45) Date of Patent: Oct. 11, 2016

(54) CARBON NANOTUBE BASED ELECTRIC HEATER WITH SUPPORTER HAVING BLIND HOLES OR PROTRUSIONS

(71) Applicants: Tsinghua University, Beijing (CN); HON HAI PRECISION INDUSTRY CO., LTD., New Taipei (TW)

(72) Inventors: Chen Feng, Beijing (CN); Kai-Li Jiang, Beijing (CN); Liang Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/297,626

(22) Filed: Jun. 6, 2014

(65) Prior Publication Data

US 2014/0284319 A1  Sep. 25, 2014

Related U.S. Application Data

(63) Continuation of application No. 12/769,805, filed on Apr. 29, 2010, now abandoned.

(30) Foreign Application Priority Data

Sep. 8, 2009 (CN) .......................... 2009 1 0190175

(51) Int. Cl.
| | |
|---|---|
| H05B 3/02 | (2006.01) |
| H05B 3/14 | (2006.01) |
| H05B 3/26 | (2006.01) |
| H05B 3/22 | (2006.01) |
| B82Y 99/00 | (2011.01) |

(52) U.S. Cl.
CPC ................ *H05B 3/145* (2013.01); *H05B 3/22* (2013.01); *H05B 3/26* (2013.01); *H05B 3/262* (2013.01); *H05B 3/265* (2013.01); *H05B 3/267* (2013.01); *B82Y 99/00* (2013.01); *H05B 2214/04* (2013.01); *Y10S 977/95* (2013.01)

(58) Field of Classification Search
CPC ..... H05B 3/22; H05B 3/145; H05B 2214/04
See application file for complete search history.

(56) References Cited

U.S. PATENT DOCUMENTS

| | | | | |
|---|---|---|---|---|
| 5,995,711 A | * | 11/1999 | Fukuoka ............... | F24H 3/0429 219/202 |
| 7,158,716 B2 | * | 1/2007 | Shapiro .................. | F04D 17/04 392/365 |
| 2008/0073336 A1 | * | 3/2008 | Bohlender ........... | F24H 3/0429 219/467.1 |
| 2009/0194525 A1 | * | 8/2009 | Lee ........................ | H05B 3/145 219/553 |

FOREIGN PATENT DOCUMENTS

EP          2043406          *    1/2009  ............. H05B 3/145

* cited by examiner

*Primary Examiner* — Jesse Y Miyoshi
(74) *Attorney, Agent, or Firm* — Zhigang Ma (57) ABSTRACT

An electric heater includes a base, a bracket, a working head and a protecting structure. The bracket is disposed on the base. The working head is disposed on the bracket. The working head includes a supporter and a heating module. The heating module is disposed on the supporter. The heating module includes a heating element and at least two electrodes. The at least two electrodes are electrically connected with the heating element. The heating element includes a carbon nanotube layer structure. The protecting structure covers the heating module.

8 Claims, 5 Drawing Sheets

CARBON NANOTUBE BASED ELECTRIC HEATER WITH SUPPORTER HAVING BLIND HOLES OR PROTRUSIONS

CROSS-REFERENCE TO RELATED APPLICATIONS

This application is a continuation of U.S. patent application Ser. No. 12/769,805, filed on Apr. 29, 2010, entitled, "ELECTRIC HEATER BASED ON A CARBON NANOTUBE LAYER STRUCTURE" which claims all benefits accruing under 35 U.S.C. §119 from China Patent Application No. 200910190175.2, filed on Sep. 8, 2009 in the China Intellectual Property Office. The application is also related to copending application Ser. No. 12/769,794 entitled, "WALL MOUNTED ELECTRIC HEATER", filed on Apr. 29, 2014.

BACKGROUND

1. Technical Field

The present disclosure generally relates to an electric heater incorporating carbon nanotubes.

2. Description of Related Art

Electric heaters are configured for generating heat from electrical energy. A typical electric heater includes a heating element and two electrodes. The heating element is located on the two electrodes. The heating element generates heat when a voltage is applied to it. The heating element is often made of metal such as tungsten. However, since metals have a relative high density, the heating element made of metal is heavy, which can damage the wall easily.

What is needed, therefore, is an electric heater based on carbon nanotubes that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
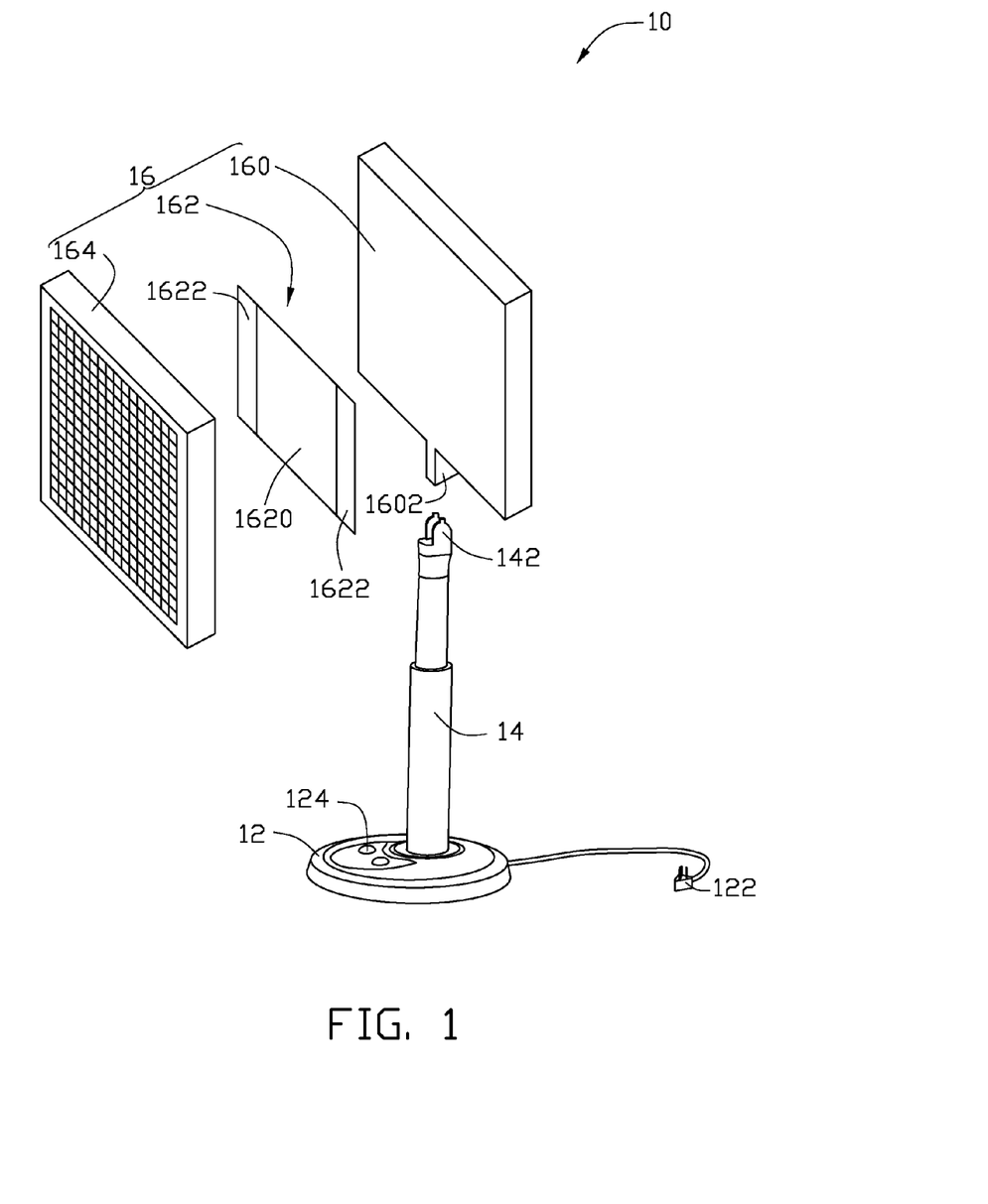
FIG. 1 is a schematic and exploded view of one embodiment of an electric heater.

Referring to FIG. 1, an electric heater 10 of one embodiment is shown. The electric heater 100 includes a base 12, a bracket 14, and a working head 16. The working head 16 is connected with the bracket 14.

The base 12 includes a source plug 122 and a switch 124. The source plug 122 is configured for electrically connecting with an electric source (not shown) of the electric heater 10. The switch 124 is configured for controlling working status and working time of the electric heater 10. The switch 124 can further control a heating direction of the working head 16.

The bracket 14 is configured for supporting the working head 16 and connecting the working head 16 to the base 12. The bracket 14 further includes a rotating element 142 disposed on one end of the bracket 14. The rotating element 142 pivotally connects with the end of the bracket 14 and can rotate around the bracket 14. The working head 16 is fixed on the rotating element 142. Thus the working head 16 can turn 360 degrees with the rotating element 142. A circuit can be set in the bracket 14 (not shown). The circuit is configured for controlling the working status of the electric heater 10. In one embodiment, the bracket 14 has a tube structure defining a hollow space, and the circuit is disposed in the hollow space.

The working head 16 includes a supporter 160, a heating module 162, and a protecting structure 164. The supporter 160 includes an extension portion 1602 connected with the rotating element 142 of the bracket 14.

The supporter 160 is configured for supporting the heating module 162. The supporter 160 can be a porous substrate, a plane substrate, or a frame. A material of the supporter 160 may be ceramic, glass, wood, or quartz. The shape and size of the supporter 160 can be determined according to the user's practical needs. For example, the supporter 160 can be square, round or triangular. In one embodiment according to FIG. 1, the supporter 160 is a square ceramic sheet about 1 centimeter (cm) thick. When the thickness of the supporter 160 is in a range from about 1 micrometer to about 1 millimeter, the electric heater 10 can have a super thin structure.

The heating module 162 is disposed on the supporter 160. The heating module 162 includes a heating element 1620 and at least two electrodes 1622. The heating element 1620 is positioned on a surface of the supporter 160, such as via adhesive or mechanical method. The two electrodes 1622 are electrically connected with the heating element 1620. The two electrodes 1622 can be disposed on a same surface or different surfaces of the heating element 1620. In one embodiment according to FIG. 1, the two electrodes 1622 are disposed on the same surface of the heating element 1620. The two electrodes 1622 can be electrically connected with the circuit system with at least two lead wires (not shown).

The heating element 1620 can be a carbon nanotube layer structure. The carbon nanotube layer structure can be planar or have a camber. The carbon nanotube layer structure can be a freestanding structure, that is, the carbon nanotube layer structure can be supported by itself without a substrate. When at least one point of the carbon nanotube layer structure is held, the entire carbon nanotube layer structure can be lifted without being destroyed. The carbon nanotube layer structure includes a plurality of carbon nanotubes joined by van der Waals attractive force therebetween. The carbon nanotube layer structure can be a substantially pure structure of the carbon nanotubes, with few impurities. The carbon nanotubes can be used to form many different structures and provide a large specific surface area. The heat capacity per unit area of the carbon nanotube layer structure can be less than $2 \times 10^{-4}$ J/m$^2$*K. In one embodiment, the heat capacity per unit area of the carbon nanotube layer structure is less than or equal to $1.7 \times 10^{-6}$ J/m$^2$*K. Because the heat capacity of the carbon nanotube layer structure is very low, the temperature of the heating element 1620 can rise and fall quickly, and has a high response heating speed. Thus, the heating element 1620 has a high heating efficiency and accuracy. In addition, because the carbon nanotube layer structure can be substantially pure, the carbon nanotubes are not easily oxidized and the lifespan of the heating element 1620 will be relatively long. Furthermore, because the carbon nanotubes have a low density, about 1.35 g/cm$^3$, thus the heating element 1620 is light. As the heat capacity of the carbon nanotube layer structure is very low, the heating element 1620. Because the carbon nanotube has a large specific surface area, the carbon nanotube layer structure with a plurality of carbon nanotubes has a larger specific surface area. If the specific surface of the carbon nanotube layer structure is large enough, the carbon nanotube layer structure is adhesive and can be directly applied to a surface.

The carbon nanotubes in the carbon nanotube layer structure can be orderly or disorderly arranged. The term 'disordered carbon nanotube layer structure' refers to a structure where the carbon nanotubes are arranged along different directions, and the aligning directions of the carbon nanotubes are random. The number of the carbon nanotubes arranged along each different direction can be almost the same (e.g. uniformly disordered). The disordered carbon nanotube layer structure can be isotropic, namely the carbon nanotube layer structure has properties identical in all directions of the carbon nanotube layer structure. The carbon nanotubes in the disordered carbon nanotube layer structure can be entangled with each other.

The carbon nanotube layer structure including ordered carbon nanotubes is an ordered carbon nanotube layer structure. The term 'ordered carbon nanotube layer structure' refers to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions). The carbon nanotubes in the carbon nanotube layer structure 164 can be selected from single-walled, double-walled, and/or multi-walled carbon nanotubes.

The carbon nanotube layer structure can be a film structure with a thickness ranging from about 0.5 nanometers (nm) to about 1 mm. The carbon nanotube layer structure can include at least one carbon nanotube film.

In one embodiment, the carbon nanotube film is a drawn carbon nanotube film. A film can be drawn from a carbon nanotube array, to obtain a drawn carbon nanotube film. The drawn carbon nanotube film includes a plurality of successive and oriented carbon nanotubes joined end-to-end by van der Waals attractive force therebetween. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. Some variations can occur in the drawn carbon nanotube film. The carbon nanotubes in the drawn carbon nanotube film are oriented along a preferred orientation. The carbon nanotube film can be treated with an organic solvent to increase the mechanical strength and toughness of the carbon nanotube film and reduce the coefficient of friction of the carbon nanotube film. The thickness of the carbon nanotube film can range from about 0.5 nm to about 100 µm.

The carbon nanotube layer structure of the heating element 1620 can include at least two stacked carbon nanotube films. In other embodiments, the carbon nanotube layer structure can include two or more coplanar carbon nanotube films, and can include layers of coplanar carbon nanotube films. Additionally, when the carbon nanotubes in the carbon nanotube film are aligned along one preferred orientation (e.g., the drawn carbon nanotube film) an angle can exist between the orientations of carbon nanotubes in adjacent films, whether stacked or adjacent. Adjacent carbon nanotube films can be joined by only the van der Waals attractive force therebetween. The number of the layers of the carbon nanotube films is not limited. However, the thicker the carbon nanotube layer structure, the specific surface area will decrease. An angle between the aligned directions of the carbon nanotubes in two adjacent carbon nanotube films can range from about 0 degrees to about 90 degrees. When the angle between the aligned directions of the carbon nanotubes in adjacent carbon nanotube films is larger than 0 degrees, the carbon nanotubes in the heating element 1620 define a microporous structure. The carbon nanotube layer structure in an embodiment employing these films will have a plurality of micropores. Stacking the carbon nanotube films will also add to the structural integrity of the carbon nanotube layer structure.

In other embodiments, the carbon nanotube film can be a flocculated carbon nanotube film. The flocculated carbon nanotube film can include a plurality of long, curved, disordered carbon nanotubes entangled with each other. Furthermore, the flocculated carbon nanotube film can be isotropic. The carbon nanotubes can be substantially uniformly dispersed in the carbon nanotube film. Adjacent carbon nanotubes are acted upon by van der Waals attractive force to obtain an entangled structure with micropores defined therein. It is noteworthy that the flocculated carbon nanotube film is very porous. Sizes of the micropores can be less than 10 µm. The porous nature of the flocculated carbon nanotube film will increase the specific surface area of the carbon nanotube layer structure. Further, due to the carbon nanotubes in the carbon nanotube layer structure being entangled with each other, the carbon nanotube layer structure employing the flocculated carbon nanotube film has excellent durability, and can be fashioned into desired shapes with a low risk to the integrity of the carbon nanotube layer structure. The thickness of the flocculated carbon nanotube film can range from about 0.5 nm to about 1 mm.

In other embodiments, the carbon nanotube film can be a pressed carbon nanotube film. The pressed carbon nanotube film can be a free-standing carbon nanotube film. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are joined by van der Waals attractive force. An angle between a primary alignment direction of the carbon nanotubes and a surface of the pressed carbon nanotube film is about 0 degrees to approximately 15 degrees. The greater the pressure applied, the smaller the angle obtained. When the carbon nanotubes in the pressed carbon nanotube film are arranged along different directions, the carbon nanotube layer structure can be isotropic. Here, "isotropic" means the carbon nanotube film has properties identical in all directions substantially parallel to a surface of the carbon nanotube film. The thickness of the pressed carbon nanotube film ranges from about 0.5 nm to about 1 mm.

The at least two electrodes 1622 can be fixed on the surface of the heating element 1620 by conductive adhesive (not shown). The at least two electrodes 1622 are made of conductive material. The shapes of the at least two electrodes 1622 are not limited and can be lamellar-shaped, rod-shaped, wire-shaped, or block-shaped. The cross sectional shape of the two electrodes 1622 can be round, square, trapezium, triangular, or polygonal. The thickness of the two electrodes 1622 can be any size, depending on the design, and can be about 1 micrometer to about 1 centimeter. In the present embodiment as shown in FIG. 1, the two electrodes 1622 both have a linear shape, and are disposed on the surface of the heating element 1620. The two electrodes 1622 are substantially parallel with each other. In one embodiment, when the heating element 1620 includes the carbon nanotube layer structure having a plurality of carbon nanotubes arranged in a same direction, the axes of the carbon nanotubes can be substantially perpendicular to the two electrodes 1622.

The protecting structure 164 covers the heating module 162. The protecting structure 164 is configured for keeping the heating module 162 away from contamination from the surroundings, and can also protect the user from getting an electric shock when touching the electric heater 10. The material of protecting structure 164 can be conductive or insulated. The electrically conductive material can be metal or alloy. The metal can be copper, aluminum or titanium. The insulated material can be resin, ceramic, plastic, or wood. The thickness of the protecting structure 164 can range from about 0.5 µm to about 2 mm. When the material of the protecting structure 164 is insulated, the protecting structure 164 can be directly disposed on a surface of the heating module 162. When the protecting structure 164 is conductive, the protecting structure 164 should be insulated with the heating module 162. The protecting structure 164 can be disposed above the heating module 162 and apart from the heating module 162. The protecting structure 164 can include a plurality of holes, such as a grid. According to one embodiment as shown in FIG. 1, the protecting structure 164 is a frame with a plurality of holes. The edges of the protecting structure 164 are fixed on the edges of the supporter 160 via four screws (not shown). The protecting structure 164 is at a distance from the heating module 162.

In use, when a voltage is applied to the two electrodes 1622 of the electric heater 10, the carbon nanotube layer structure can radiate heat at a certain wavelength. By controlling the specific surface area of the carbon nanotube layer structure, and selecting the voltage and the thickness of the carbon nanotube layer structure, the carbon nanotube layer structure emits heat at different wavelengths. If the voltage is determined at a certain value, the wavelength of the electromagnetic waves emitted from the carbon nanotube layer structure is inversely proportional to the thickness of the carbon nanotube layer structure. That is to say, the greater the thickness of carbon nanotube layer structure is, the shorter the wavelength of the electromagnetic waves. Furthermore, if the thickness of the carbon nanotube layer structure is determined at a certain value, the greater the voltage applied to the electrodes 1622, the shorter the wavelength of the electromagnetic waves. As such, the electric heater 10 can easily be controlled for emitting a visible light and create general thermal radiation or emit infrared radiation, the electric heater 10 can also be used as a light source.

Figure 2:
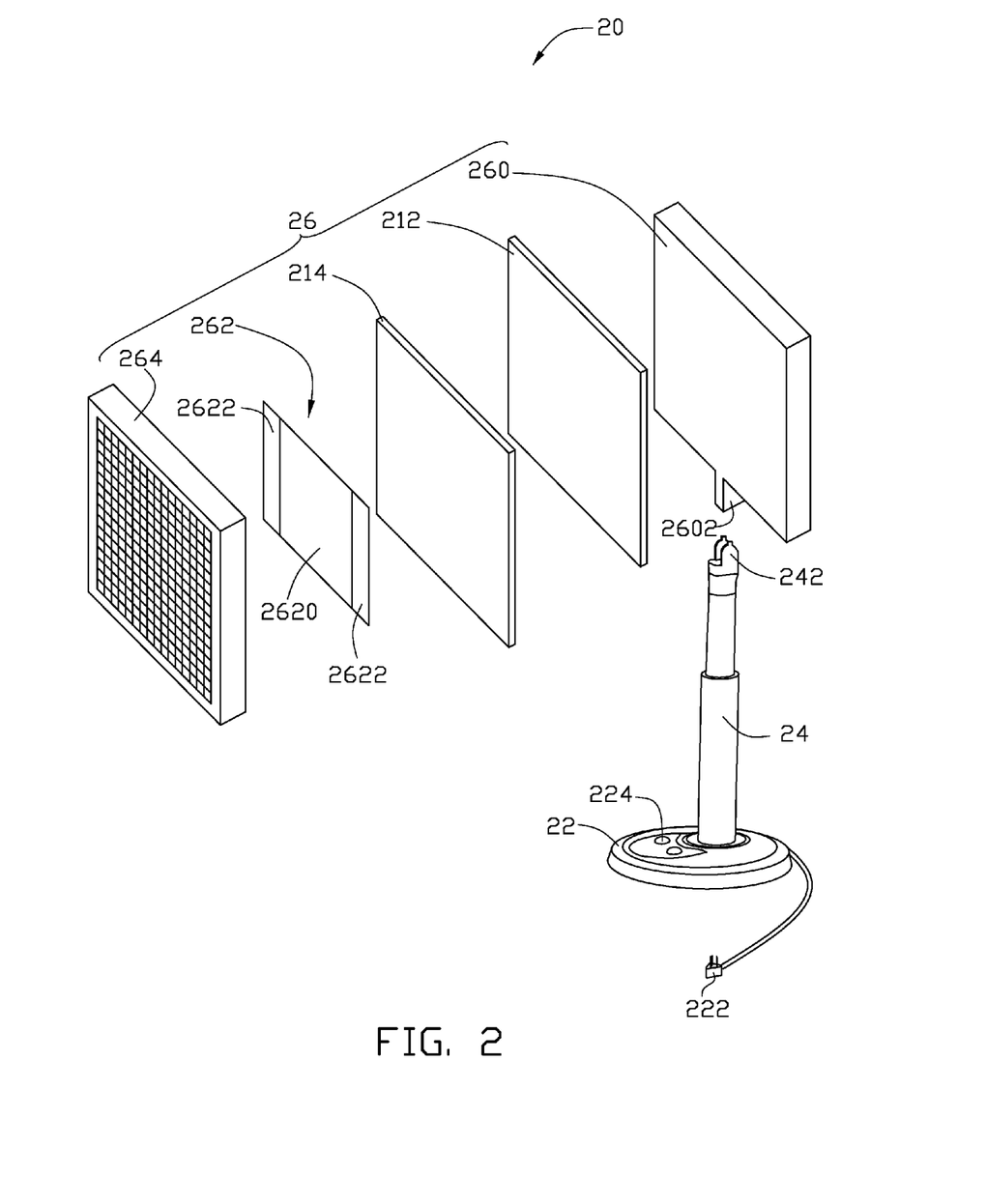
FIG. 2 is a schematic and exploded view of another embodiment of an electric heater.

Referring to FIG. 2, an electric heater 20 according to another embodiment is provided. The electric heater 20 includes a base 22, a bracket 24, and a working head 26. The base 22 includes a source plug 222 and a switch 224. The bracket 24 further includes a rotating element 242 disposed on one end of the bracket 24. The working head 26 is fixed on the rotating element 242. The working head 26 includes a supporter 260, a heating module 262 and a protecting structure 264. The heating module 262 includes a heating element 2620 and at least two electrodes 2622. The supporter 260 includes an extension portion 2602 connected with the rotating element 242 of the bracket 24.

The working head 26 further includes a heat-reflective layer 212. The heat-reflective layer 212 is disposed between the supporter 260 and the heating module 262. The heat-reflective layer 212 is disposed on a surface of the supporter 260.

The heat-reflective layer 212 is configured to reflect back the heat emitted by the heating module 262, and control the direction of the heat emitted by the heating module 262 for single-side heating. The material of the heat-reflective layer 212 can be selected from conductive materials or insulated materials. The insulated materials can be metal oxides, metal salts, or ceramics. In one embodiment, the heat-reflective layer 212 is an aluminum oxide ($Al_2O_3$) film. The thickness of the heat-reflective layer 212 can be in a range from about 100 micrometers (µm) to about 0.5 mm.

If the heat-reflective layer 212 is made of conductive materials, such as silver, aluminum, gold or alloy, an insulated layer 214 can be further provided and can be disposed between the heat-reflective layer 212 and the heating module 262. The material of the insulated layer 214 can be ceramic, glass or plastic. A thickness of the insulated layer 214 can be in a range from about 1 micrometer to 1 millimeter. The insulated layer 214 can be omitted when the material of the heat-reflective layer 212 is insulated.

The electric heater 20 having the heat-reflective layer 212 can emit heat in one direction. The heat-reflective layer 212 can reflect the heat produced by the heating module 262 away from the supporter 260. The heat will not destroy the supporter 260. In addition, the efficiency of the electric heater 20 is improved.

Other characteristics of the electric heater 20 are the same as the electric heater 10 disclosed above.

Figure 3:
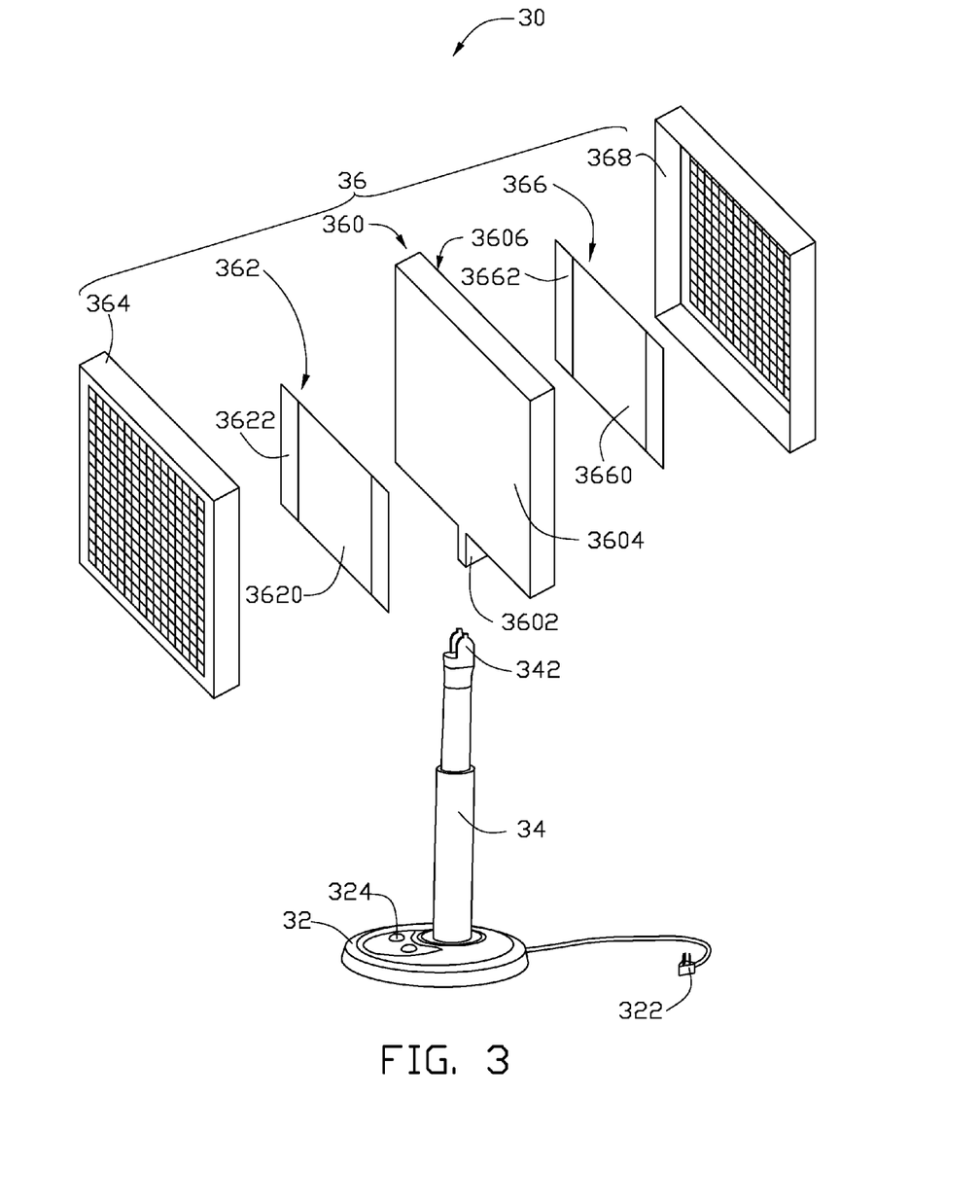
FIG. 3 is a schematic and exploded view of yet another embodiment of an electric heater.

Referring to FIG. 3, an electric heater 30 according to another embodiment is provided. The electric heater 30 includes a base 32, a bracket 34, and a working head 36. The base 32 includes a source plug 322 and a switch 324. The bracket 34 further includes a rotating element 342 that is disposed on one end of the bracket 34. The working head 36 is fixed on the rotating element 342.

The working head 36 includes a supporter 360, a first heating module 362, a second heating module 366, a first protecting structure 364, and a second protecting structure 368. The first heating module 362 includes a first heating element 3620 and at least two first electrodes 3622. The second heating module 366 includes a second heating element 3660 and at least two second electrodes 3662. The supporter 360 includes an extension portion 3602 connected with the rotating element 342 of the bracket 34.

The supporter 360 includes a first surface 3604 and a second surface 3606 opposite to the first surface 3604. The first heating module 362 is disposed on the first surface 3604. The first protecting structure 364 covers the first heating module 362. The characteristics of the first heating module 362 and the first protecting structure 364 are the same as the heating module 162 and the protecting structure 164 disclosed above. The second heating module 366 is disposed on the second surface 3606. The second protecting structure 368 covers the second heating module 366. The characteristics of the second heating module 366 and the second protecting structure 368 are the same as the heating module 162 and the protecting structure 164 disclosed above.

Other characteristics of the electric heater 30 are the same as the electric heater 10 disclosed above.

The electric heater 30, including two heating modules 362 and 366 disposed on the opposite surfaces of the supporter 360, has high heating efficiency and large heating scope. The electric heater 30 can be used in a large space such as an office and hotel hall.

Figure 4:
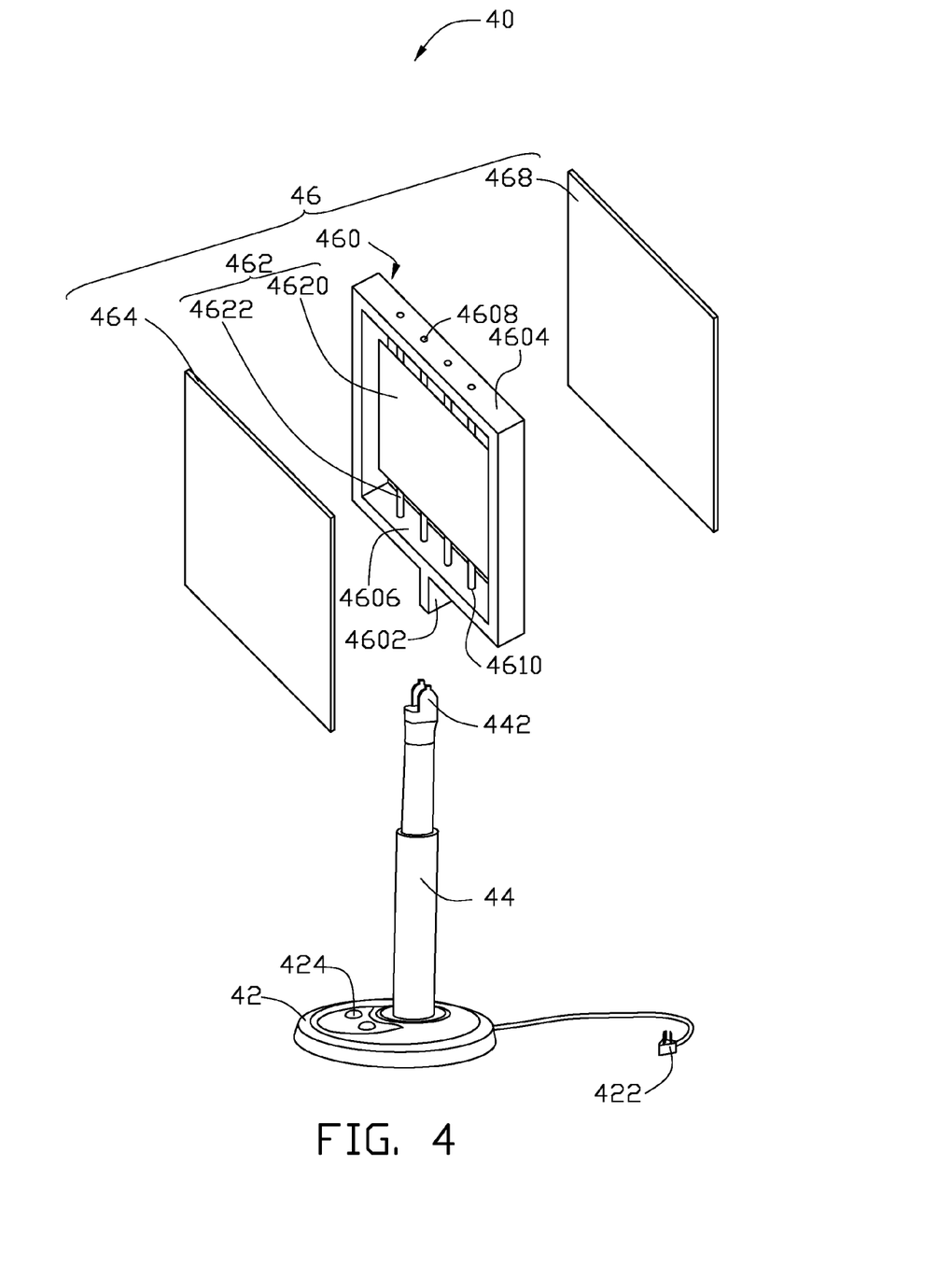
FIG. 4 is a schematic and exploded view of still yet another embodiment of an electric heater.

Referring to FIG. 4, an electric heater 40 according to one embodiment is provided. The electric heater 40 includes a base 42, a bracket 44 and a working head 46. The base 42 includes a source plug 422 and a switch 424. The bracket 44 further includes a rotating element 442 disposed on one end of the bracket 44. The working head 46 is fixed on the rotating element 442. The working head 46 includes a supporter 460, a heating module 462, a first protecting structure 464 and a second protecting structure 468. The supporter 460 includes an extension portion 4602 connected with the rotating element 442 of the bracket 24.

The supporter 460 has a frame structure. The supporter 460 includes a first side sheet 4604 and a second side sheet 4606 facing the first side sheet 4604. The first side sheet 4604 includes a plurality of first holes 4608. The second side sheet 4606 includes a plurality of second holes 4610. The numbers of the first holes 4608 and the second holes 4610 are uniform. The first holes 4608 and the second holes 4610 are disposed in a one to one manner. In one embodiment according to FIG. 4, the number of the first holes 4608 is four, the number of the second holes 4610 is four. The four first holes 4608 are disposed uniformly on the first side sheet 4604. The four second holes 4610 are disposed uniformly on the second side sheet 4606.

The heating module 462 includes a heating element 4620 and four electrodes 4622. All of the four electrodes 4622 is a metal wire. Two ends of each electrode 4622 pass through one first hole 4608 and one second hole 4610 separately. The four electrodes 4622 are fixed by the first holes 4608 and the second holes 4610. The heating element 4620 are disposed on and supported by the four electrodes 4622. The heating element 4620 is hung in the air via the four electrodes 4622. The heating element 4620 includes a carbon nanotube layer structure.

The first protecting structure 464 and the second protecting structure 468 both cover the heating module 462. The peripheral of the first protecting structure 464 are fixed on one side of the supporter 460. The peripheral of the second protecting structure 468 is fixed on another side of the supporter 460. The first protecting structure 464, the second protecting structure 468 and the supporter 460 form a hollow enclosure, and the heating module 462 are disposed in the enclosure. The first protecting structure 464 and the second protecting structure 468 are both made of glass. The heating element made of carbon nanotube layer structure can be transparent. The electric heater 40 is transparent. In use, the transparent electric heater 40 will not interfere with the line of sight. Furthermore, as the carbon nanotube layer structure can emit visible light, the electric heat can also be used as a light source.

Other characters of the electric heater 40 are the same as the electric heater 10 disclosed above.

Figure 5:
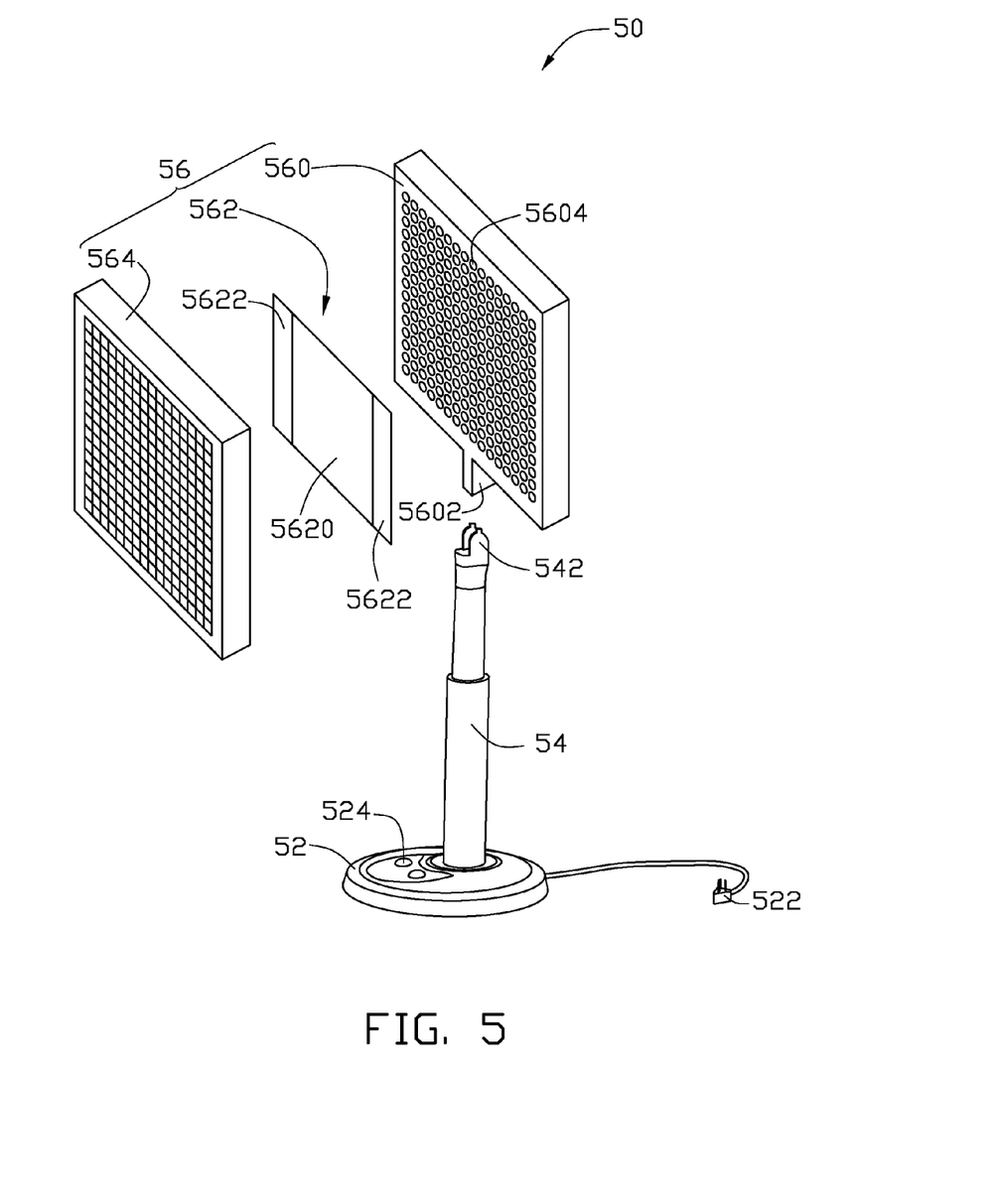
FIG. 5 is a schematic and exploded view of an embodiment of an electric heater.

Referring to FIG. 5, an electric heater 50 according to still yet another embodiment is provided. The electric heater 50 includes a base 52, a bracket 54, and a working head 56. The base 52 includes a source plug 522 and a switch 524. The bracket 54 further includes a rotating element 542 disposed on one end of the bracket 54. The working head 56 is fixed on the rotating element 542. The working head 56 includes a supporter 560, a heating module 562 and a protecting structure 564. The heating module 562 includes a heating element 5620 and at least two electrodes 5622. The supporter 560 includes an extension portion 5602 connected with the rotating element 542 of the bracket 54.

The supporter 560 includes a surface 5604, and the heating element 5620 that are disposed on the surface 5604. The surface 5604 can be a non-planar surface, and the supporter 560 can include at least one groove or protrusion. The grooves can be blind holes or through holes. Moreover, the cross sectional surface of the groove or the protrusion can be round, square, triangle or other irregular shapes. At least a portion of the heating element 5620 hangs in the air via the groove or the protrusion of the supporter 560. In addition, the contacting surface between the heating element 5620 and the supporter 560 can be decreased via the groove or the protrusion, the heat transfer between the heating element 5620 and the supporter 560 will be decreased. As such, the electric heater 50 has a high efficiency.

It is to be understood that the above-described embodiments are intended to illustrate rather than limit the present disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What claimed is:

1. An electric heater comprising:
   a base;
   a bracket disposed on the base; and
   a working head disposed on the bracket and comprising a supporter, a heating module disposed on the supporter, and at least one protecting structure covering the heating module,
   wherein the heating module comprises a heating element and at least two electrodes electrically connected with the heating element, the heating element consists of a carbon nanotube layer structure; the supporter comprises a non-planar surface defining a plurality of blind holes or protrusions, the heating element is in direct contact with the supporter, and at least a portion of the heating element is suspended on the supporter via the plurality of blind holes or the protrusions.

2. The electric heater of claim 1, wherein the heat capacity per unit area of the carbon nanotube layer structure is less than or equal to about $2 \times 10^{-4}$ J/cm$^2$*K.

3. The electric heater of claim 1, wherein the carbon nanotube layer structure comprises at least one carbon nanotube film comprising a plurality of carbon nanotubes substantially parallel with each other.

4. The electric heater of claim 3, wherein the carbon nanotubes in the at least one carbon nanotube film form a plurality of carbon nanotube segments joined end-to-end and each of the carbon nanotube segments comprises a plurality of carbon nanotubes disposed side by side.

5. The electric heater of claim 3, wherein the carbon nanotubes in the at least one carbon nanotube film are substantially perpendicular to the at least two electrodes.

6. The electric heater of claim 1, wherein the protecting structure is a grid defining a plurality of holes.

7. The electric heater of claim 1, wherein the protecting structure is disposed above and apart from the heating module.

8. The electric heater of claim 1, wherein the bracket comprises a rotating element disposed on an end of the bracket, the supporter comprises an extension portion, and the extension portion of the supporter is connected to the bracket via the rotating element.

* * * * *